UNITED STATES PATENT OFFICE.

FRANK A. CRANDALL, OF CHICAGO, ILLINOIS.

COMPOSITION OF MATTER.

949,061.      Specification of Letters Patent.      Patented Feb. 15, 1910.

No Drawing.      Application filed April 6, 1908. Serial No. 425,544.

*To all whom it may concern:*

Be it known that I, FRANK A. CRANDALL, a citizen of the United States, residing at 2034 Indiana avenue, Chicago, in the county of Cook and State of Illinois, have invented a new and useful Composition of Matter to be Used in Filling Cracks and Improving the Surface of Wood, Iron, Stone, Plaster, and the Like, of which the following is a specification.

The herein described composition of matter can be used for filling cracks and crevices and putting a surface on rough woodwork.

The herein described composition of matter is of a pasty consistency and consists of a liquid and powder to be combined. The liquid consists of water, salt, oil of sassafras and glycerin. The powder consists of plaster of paris, dextrin, white lead, the whole intimately commingled.

I find that the following formula and method of mixing gives the best results:—

*Liquid.*

| | |
|---|---|
| Water | 93¾ lbs. |
| Salt | 5 lbs. |
| Oil of sassafras | 1 lb. |
| Glycerin | ¼ lb. |

*Powder.*

| | |
|---|---|
| Plaster of paris | 80 lbs. |
| Dextrin | 13 lbs. |
| White lead | 7 lbs. |

The herein described composition of matter can be used for filling dents, scratches, slivered and rough places in woodwork.

I am aware that plaster of paris, dextrin and white lead have been used before; but I am not aware that plaster of paris, dextrin and white lead have been used in connection with water, oil of sassafras, salt and glycerin.

What I claim and desire to secure by Letters Patent of the United States is:

The herein-described composition of matter for filling cracks and surfacing wood, consisting of water ninety-three and three-fourths pounds, salt five pounds, oil of sassafras one pound, and glycerin one-fourth pound, plaster of paris, eighty pounds, dextrin thirteen pounds and white lead seven pounds, combined substantially as stated.

In testimony whereof I have signed my name to the specification in the presence of two subscribing witnesses.

FRANK A. CRANDALL.

Witnesses:
    LILLIAN M. SMITH,
    M. CRAWLEY.